(12) United States Patent
Meyer

(10) Patent No.: US 7,204,179 B1
(45) Date of Patent: Apr. 17, 2007

(54) SHEAR ASSEMBLY FOR A ROLL FORMING MACHINE

(75) Inventor: Bruce E. Meyer, Port Charlotte, FL (US)

(73) Assignee: Englert, Inc., Perth Amboy, NJ (US)

( * ) Notice: Subject to any disclaimer, the term of this patent is extended or adjusted under 35 U.S.C. 154(b) by 0 days.

(21) Appl. No.: 11/253,270

(22) Filed: Oct. 18, 2005

(51) Int. Cl.
*B26D 5/16* (2006.01)
*B26D 5/00* (2006.01)

(52) U.S. Cl. .......................... 83/555; 83/628; 83/638; 83/694; 83/454; 83/646

(58) Field of Classification Search .................. 83/52, 83/54, 213, 456, 466.1, 554, 555, 629, 636, 83/638, 646, 693–695, 465, DIG. 2, 453, 83/454, 455, 444, 452
See application file for complete search history.

(56) References Cited

U.S. PATENT DOCUMENTS

| 786,236 | A | * | 3/1905 | Ross | 83/555 |
| 861,122 | A | * | 7/1907 | John | 83/554 |
| 1,589,657 | A | * | 6/1926 | Pels | 83/646 |
| 1,758,019 | A | * | 5/1930 | Williams | 83/555 |
| 3,656,388 | A | * | 4/1972 | Valente | 83/456 |
| 4,981,060 | A | * | 1/1991 | Knudson | 83/555 |
| 6,510,773 | B1 | * | 1/2003 | Hart et al. | 83/171 |
| 6,659,939 | B2 | * | 12/2003 | Moll et al. | 600/102 |

* cited by examiner

*Primary Examiner*—Boyer D. Ashley
*Assistant Examiner*—Edward Landrum
(74) *Attorney, Agent, or Firm*—David L. Davis

(57) ABSTRACT

A shear assembly for a roll forming machine which forms a rain gutter. A pair of coplanar blade members separated along a vertical line are caused to first move vertically downwardly, then have their lower ends pivot outwardly and, finally, have their upper ends pivot outwardly. The last motion is accomplished with enhanced mechanical advantage to cut through multiple layers of metal at the upper end of the gutter.

6 Claims, 8 Drawing Sheets

SHEAR ASSEMBLY FOR A ROLL FORMING MACHINE

BACKGROUND OF THE INVENTION

This invention relates to a roll forming machine for producing a rain gutter and, more particularly, to a shear assembly disposed in a cutting station at the exit end of the roll forming machine.

Roll forming machines for producing rain gutters are generally well known. In such a machine, the gutters are formed from a supply coil of sheet metal which is finished on a first side so that the exterior of the finished gutter has an aesthetically pleasing appearance. As the sheet metal is driven through the machine along a predetermined path of travel, its lateral profile is gradually transformed from a flat sheet into a downwardly concave trough having a desired lateral profile and with the finished side of the sheet metal forming the exterior surface of the trough. As the finished gutter exits the machine, it passes through a cutting station including a shear assembly which may be selectively activated to sever the gutter so that a desired length of finished gutter is separated from the partially finished gutter which remains in the machine. Activation of the shear assembly is typically by means of a manually operated lever which drives a cutting blade between a pair of spaced die plates and through the finished gutter. Due to the shape of the gutter being a downwardly concave trough, to achieve a neatly finished cut, it would be desirable to have the blade driven both downwardly and laterally. This requires a split blade, wherein during a phase of the blade movement, the two blade parts are separated to achieve the outwardly lateral cutting action. However, during this phase of the cutting operation, a bent portion of the gutter profile is typically deformed so that the blade is forced to cut through multiple thicknesses of the gutter material. It would therefore be desirable to provide a mechanism whereby the lateral movement of the two blade parts is achieved with maximum mechanical advantage so that a neat cut is achieved without jamming.

SUMMARY OF THE INVENTION

The present invention finds utility in a roll forming machine of the type which forms an indeterminate length panel having a desired lateral profile from a uniform width supply strip of sheet metal having a pair of parallel straight edges. The roll forming machine drives the supply strip along a predetermined path of travel through a series of spaced roll forming stations, which gradually deform the initially flat strip into the desired lateral profile, illustratively a downwardly concave trough, to form a rain gutter. As the gutter leaves the machine, it passes through a cutting station, which includes the inventive shear assembly. According to this invention, the shear assembly includes a pair of coplanar blade members separated along a generally vertical line. The blade members are pivotally connected at their upper ends to a vertically movable actuator block by respective link members which are pivotally connected to the block and to the two blade members. Near the lower ends of the blade members are dogleg shaped cam openings which cooperate with respective cam followers secured to the machine. Guide rollers secured to the machine are disposed on opposite sides of the blade members, which have guide surfaces parallel to the vertical movement of the actuator block. The guide surfaces are terminated at their upper ends with beveled surfaces which are angled toward each other. Thus, the movement of the blade members starts off vertically downward until the dogleg bends of the cam openings reach the cam followers. At this point, the lower ends of the blade members pivot outwardly about the guide rollers as they continue to move downwardly. When the ends of the cam openings reach the cam followers, the guide surface bevels reach the guide rollers. The cam followers prevent further downward movement of the blade members, so continued downward movement of the actuator block causes the upper ends of the blade members to pivot outwardly about the cam followers, in the opposite angular direction from the previous outward pivoting. The link members provide enhanced mechanical advantage to movement of the blade members during this final pivoting phase.

BRIEF DESCRIPTION OF THE DRAWINGS

The foregoing will be more readily apparent upon reading the following description in conjunction with the drawings in which like elements in different figures are identified by the same reference numeral and wherein.

DETAILED DESCRIPTION

Figure 1:
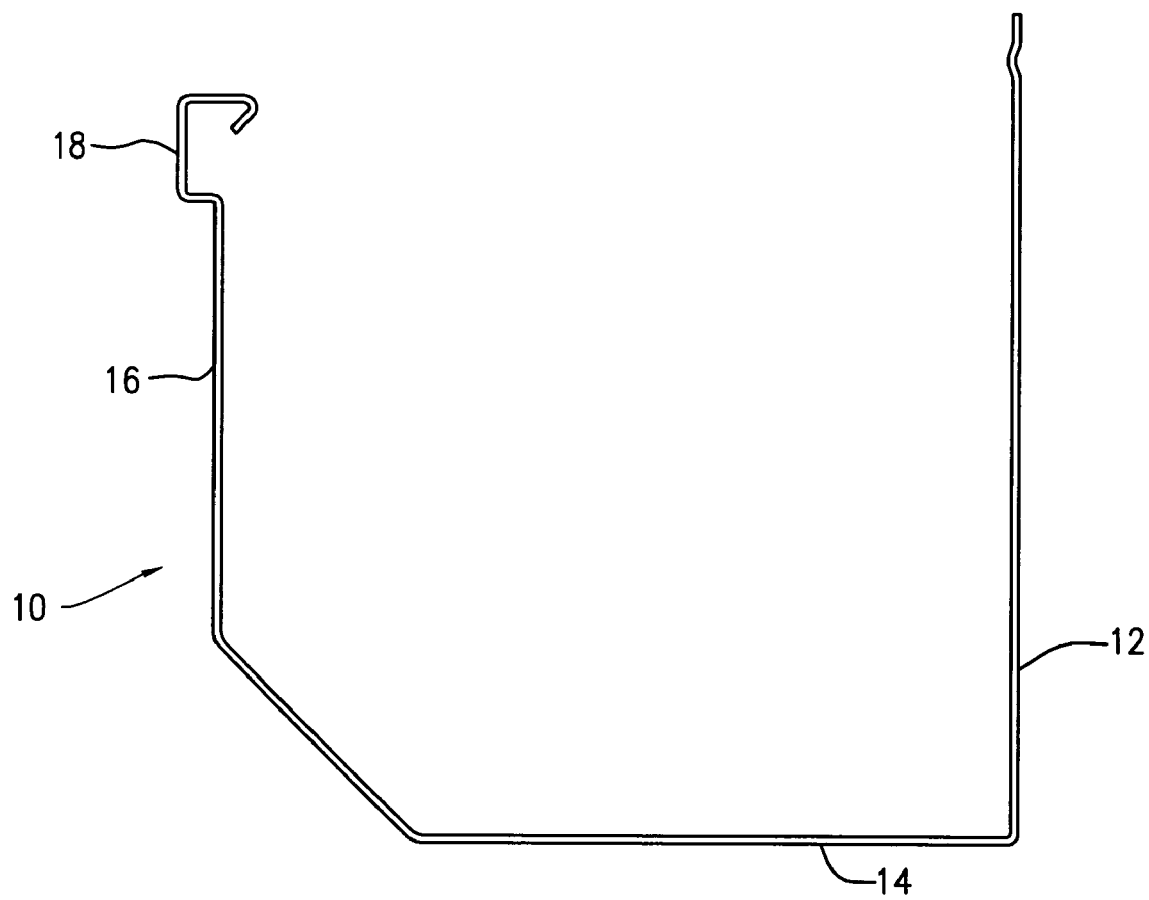
FIG. 1 shows an exemplary rain gutter lateral profile which can be produced by a roll forming machine incorporating the present invention.

Referring to the drawings, FIG. 1 shows the profile of an exemplary rain gutter, designated generally by the reference numeral 10, which can be produced by a roll forming machine incorporating structure embodying the present invention. The gutter 10 is generally in the form of a downwardly concave trough having a back wall 12, a lower wall 14 and a face wall 16. As is the general practice in the art, the back wall 12 is designed to abut supporting structure on a building to which the gutter 10 is attached, and therefore cannot be seen by an observer. However, the face wall 16 is designed to be visible from outside the building and therefore it is desired that the exterior surface of the face wall 16 be finished to provide an aesthetically pleasing appearance. To provide strength to the gutter 10, the upper end 18 of the face wall 16 is bent and folded, as shown in the drawing.

Figure 2:
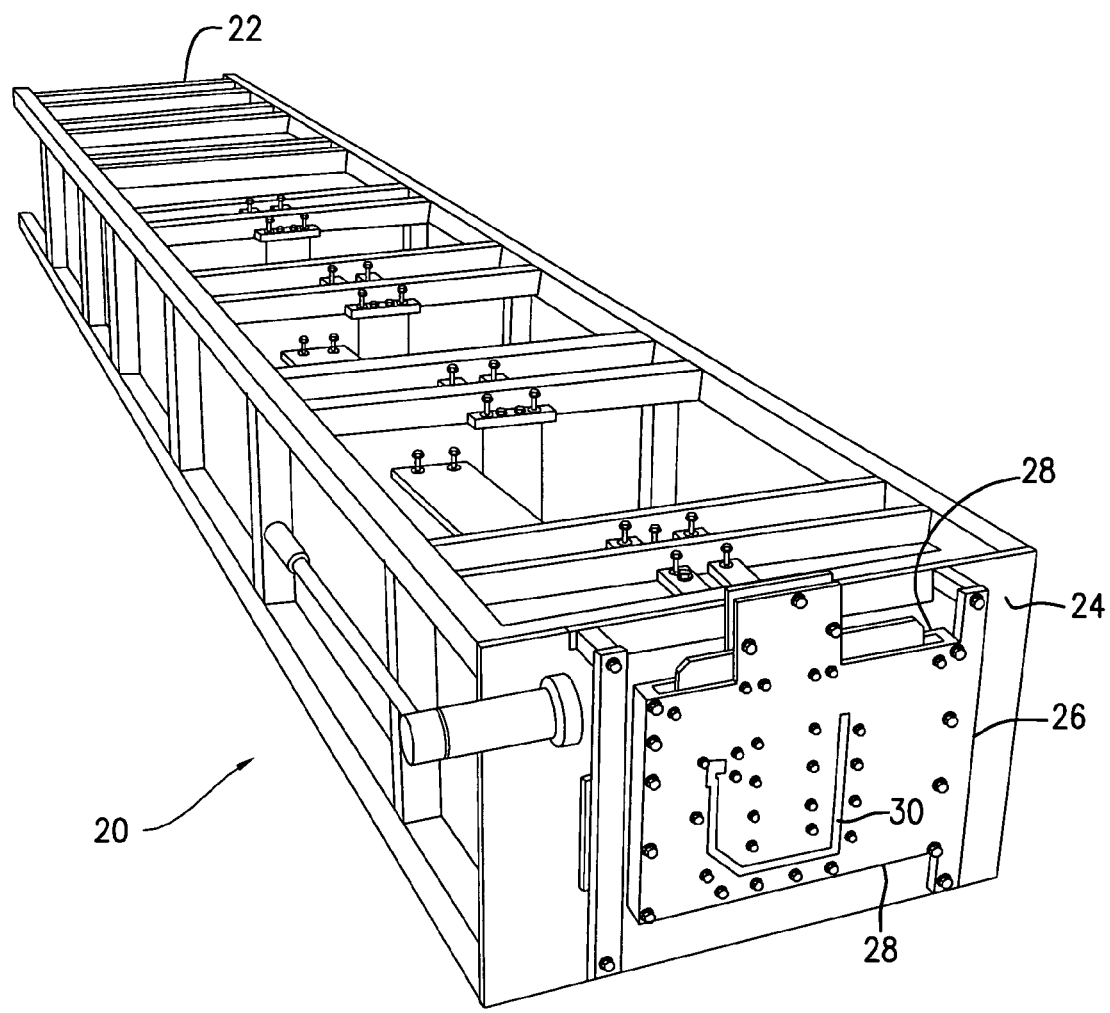
FIG. 2 is a perspective view of an exemplary roll forming machine in which structure constructed according to the present invention is incorporated.
Figure 3:
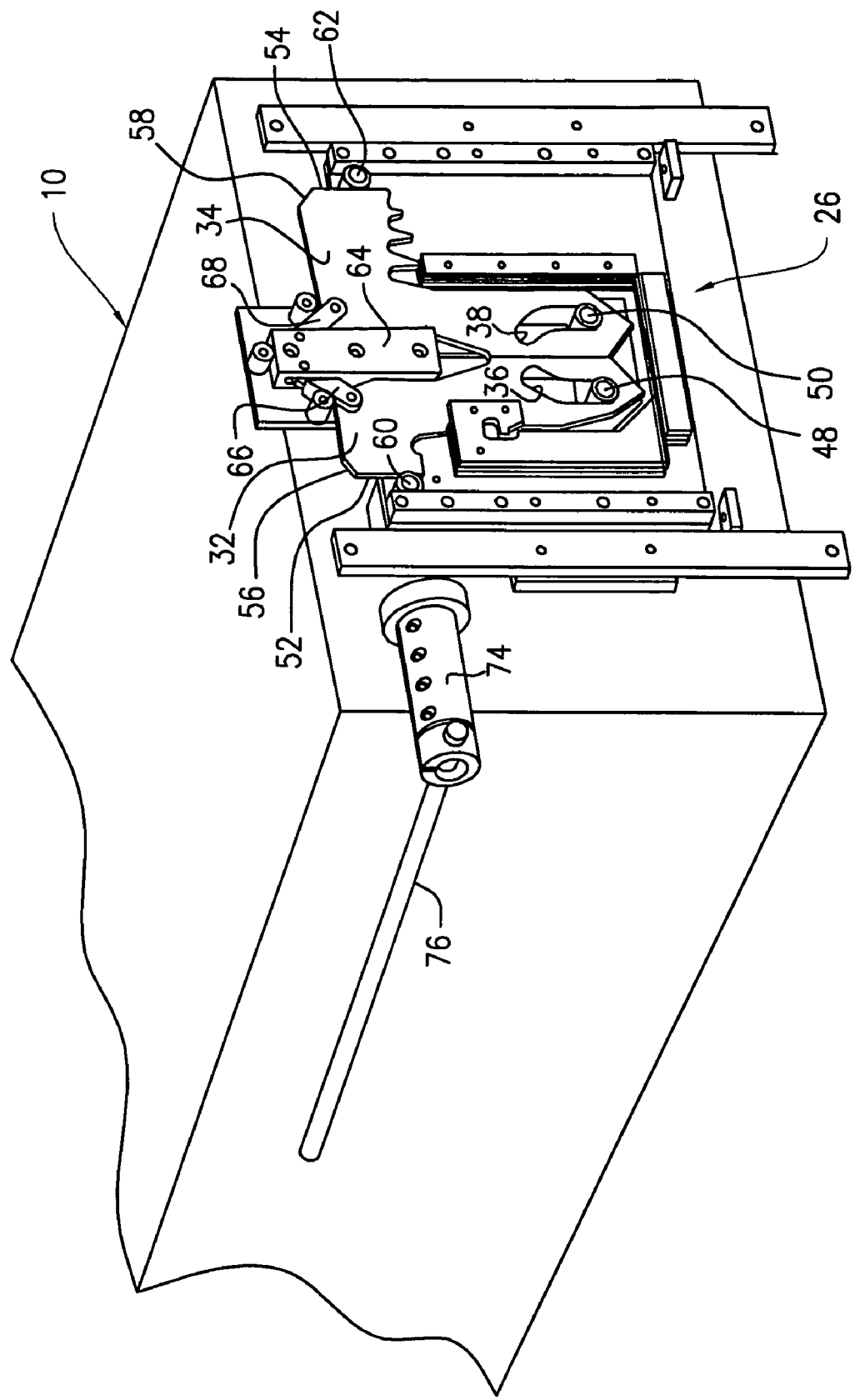
FIG. 3 is a perspective view showing the inventive shear assembly, with covers removed, at the exit of the roll forming machine.
Figure 4:
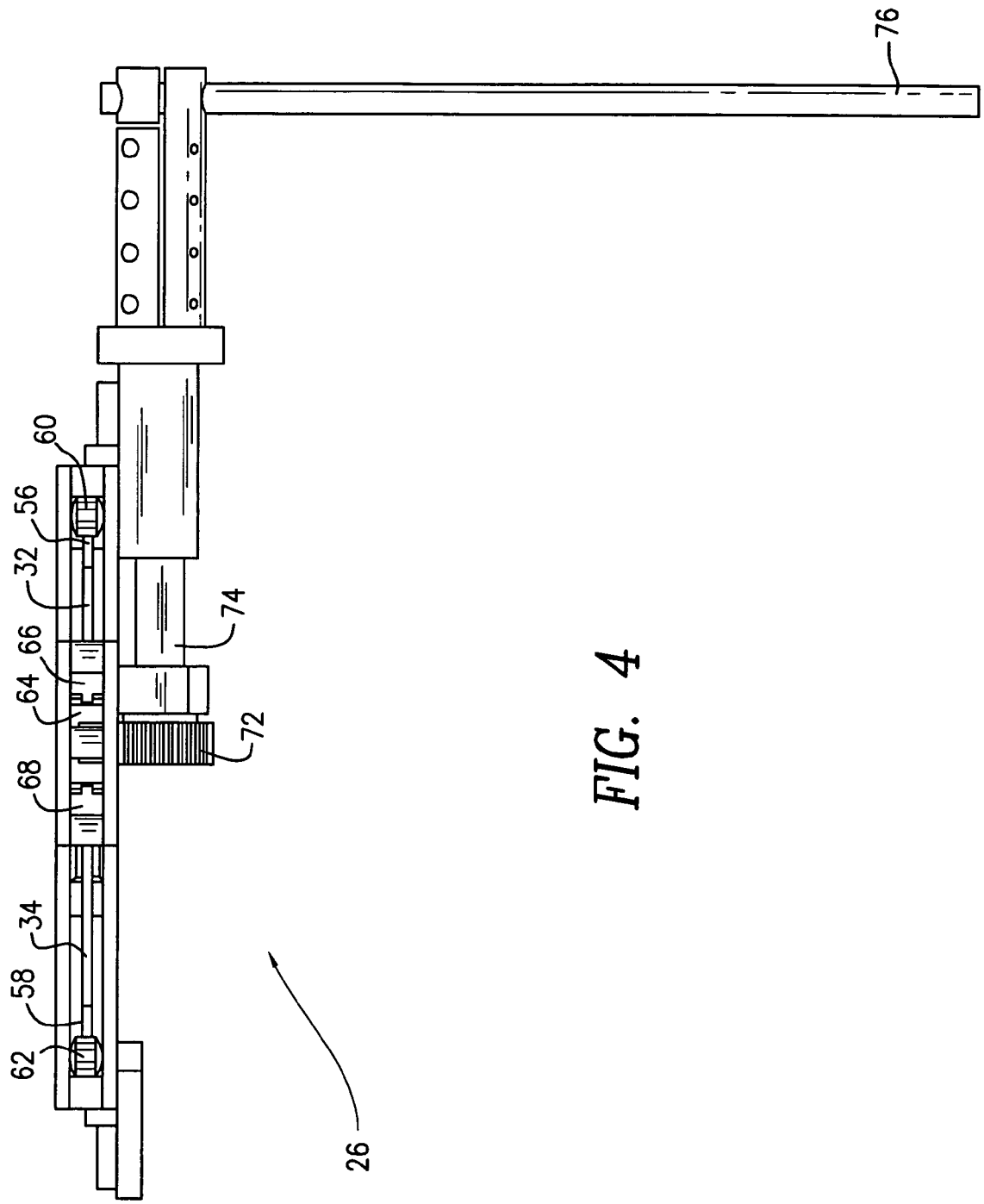
FIG. 4 is a top plan view of the inventive shear assembly.
Figure 5:
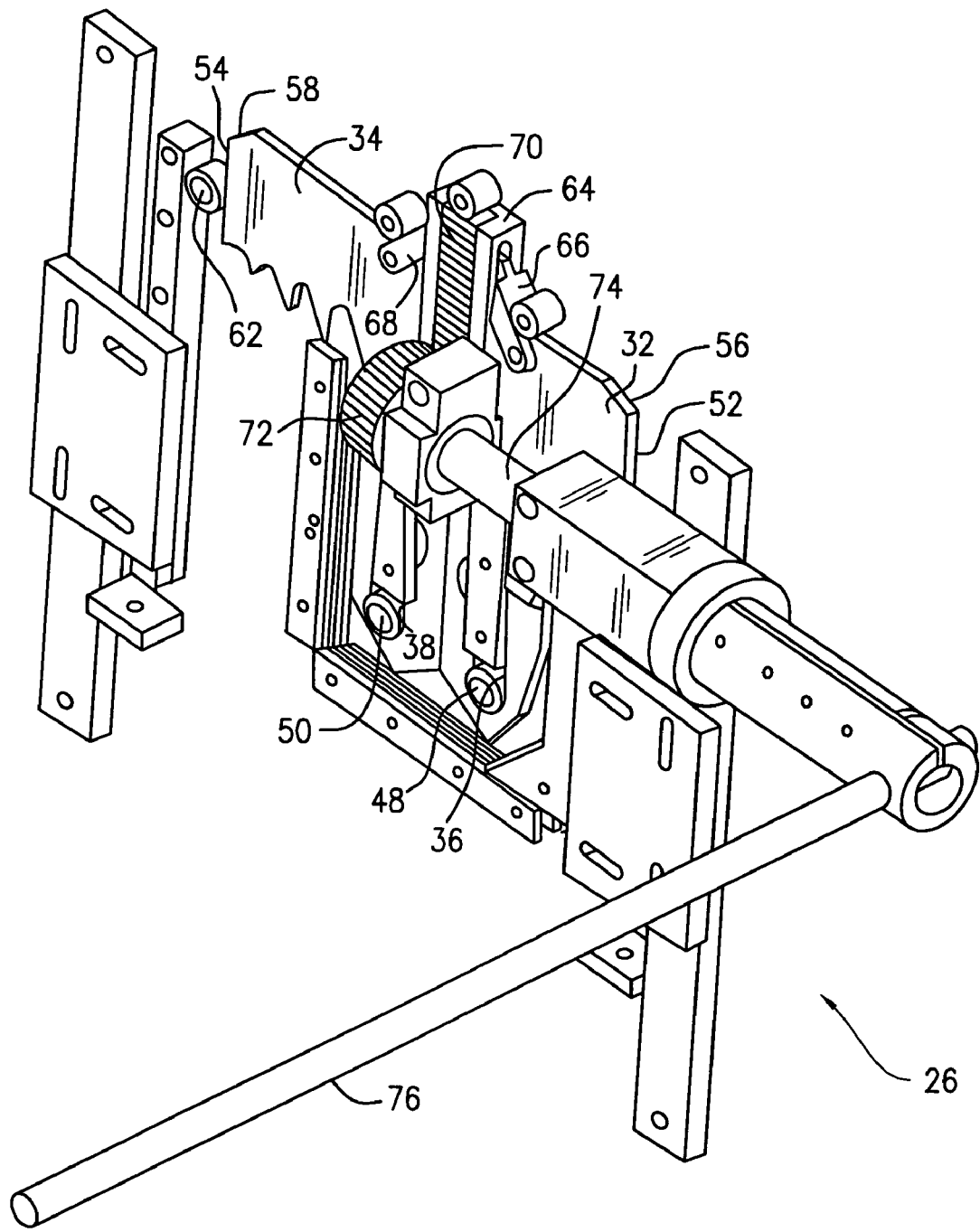
FIG. 5 is a perspective view showing the rear of the inventive shear assembly and illustrating the activation mechanism.
Figure 6:
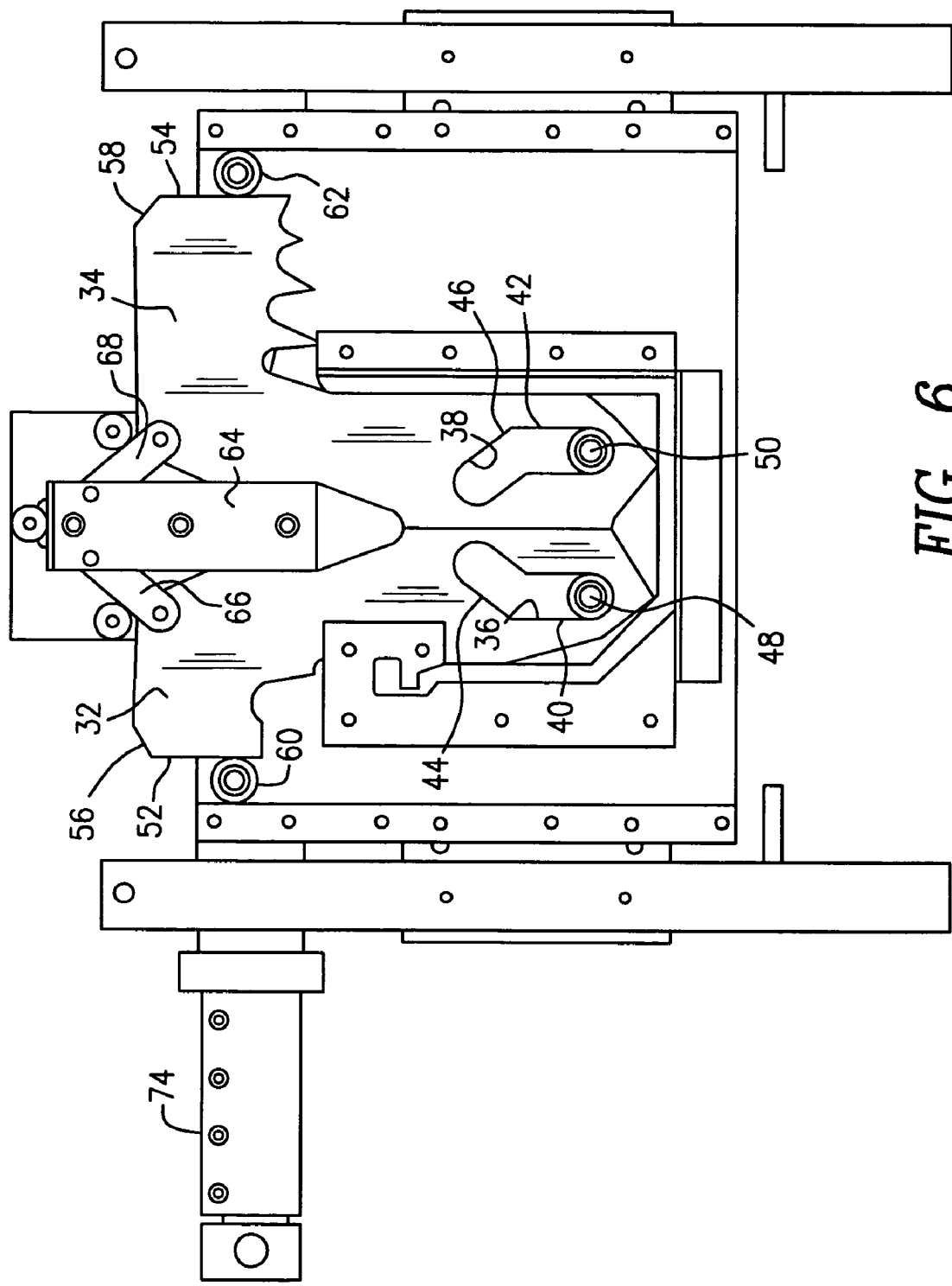
FIGS. 6–8 are front elevation views of the inventive shear assembly, with covers removed, showing different stages of the cutting operation.

FIG. 2 shows a roll forming machine, designated generally by the reference numeral 20, which may be used for forming the gutter 10. As is conventional, the machine 20 has a spindle (not shown) near its entry end 22 for supporting a supply coil of sheet metal (not shown). The sheet metal supply coil is of uniform width and has a pair of parallel straight edges. The sheet metal is finished, as by painting for example, on one side so that the exterior surface of the formed gutter 10 is finished. As is known in the roll forming art, the supply coil is pulled by driven rollers so as to travel through the machine 20 along a predetermined path past a plurality of spaced roll forming stations. As the supply coil is pulled through the machine 20, each successive roll forming station operates to gradually transform the lateral profile of the sheet metal from a flat sheet to the profile shown in FIG. 1. Thus, the sheet metal starts as a flat sheet with its finished side on the bottom and gradually assumes a downwardly concave trough-like shape with its finished side on the outside of the gutter. At the exit end 24 of the machine 20 is a cutting station 26 for cutting the formed gutter to a desired length. The cutting station 26 includes a pair of spaced parallel die plates 28. Each of the die plates 28 has a respective opening 30 aligned with the opening of the other die plate through which the finished gutter passes as it exits the machine 20. The openings 30 have generally the same shape as the profile of the finished gutter, but are larger so that the finished gutter passes freely therethrough. The foregoing is well known in the art of roll forming machines and does not form a part of the present invention.

As is clearly shown in FIGS. 3–8, the inventive shear assembly which forms a part of the cutting station 26 includes a blade assembly having a pair of coplanar blade members 32 and 34 separated along a vertical line. The blade members 32,34 are movable within their plane between the die plates 28. Each of the blade members 32,34 has a respective dogleg shaped cam opening 36,38 near its lower end. The cam openings 36,38 are mirror images of each other, each having a respective first straight portion 40,42 parallel to the first straight portion of the other cam opening and a respective second straight portion 44,46 at the upper end of the first straight portion which is angled toward the other blade member. A pair of cam followers 48,50 are secured to the machine 20 and extend each into a respective one of the cam openings 36,38.

Each of the blade members 32,34 also has a guide surface including a respective first straight side edge portion 52,54 near its upper end, remote from the other blade member and parallel to the first straight side edge portion of the other blade member. As part of each guide surface, each of the first straight side edge portions 52,54 is terminated at its upper end by a respective second straight side edge portion 56,58 which is angled toward the other blade member. The guide surfaces of the two blade members 32,34 are mirror images of each other so that the angles of the second straight side edge portions relative to their respective first straight side edge portions are equal. A pair of guide rollers 60,62 are secured to the machine 20, with each being in contact with the guide surface of a respective one of the blade members 32,34.

The blade members 32,34 are connected to the block 64 near their upper ends, above the respective cam openings 36,38. These connections are by means of the rigid links 66,68, respectively. The links 66,68 are each pivotally connected at both of their ends to the block 64 and to a respective one of the blade members 32,34. The block 64 is generally rectilinear in shape and has rack gear teeth 70 (FIG. 5) on its side surface facing into the machine 20. To selectively move the blade members 32,34 in order to sever a desired length of rain gutter after formation by the machine 20, there is provided an actuator coupled to the block 64. The actuator includes a rotary gear 72 engaged with the rack gear teeth 70 of the block 64. The shaft 74 is journaled for rotation on the machine 20 and the rotary gear 72 is mounted to the shaft 74 for rotation therewith. To rotate the shaft 74, there is provided a lever arm 76 which is secured to the shaft 74 and extends transversely thereto, preferably orthogonally.

Figure 7:
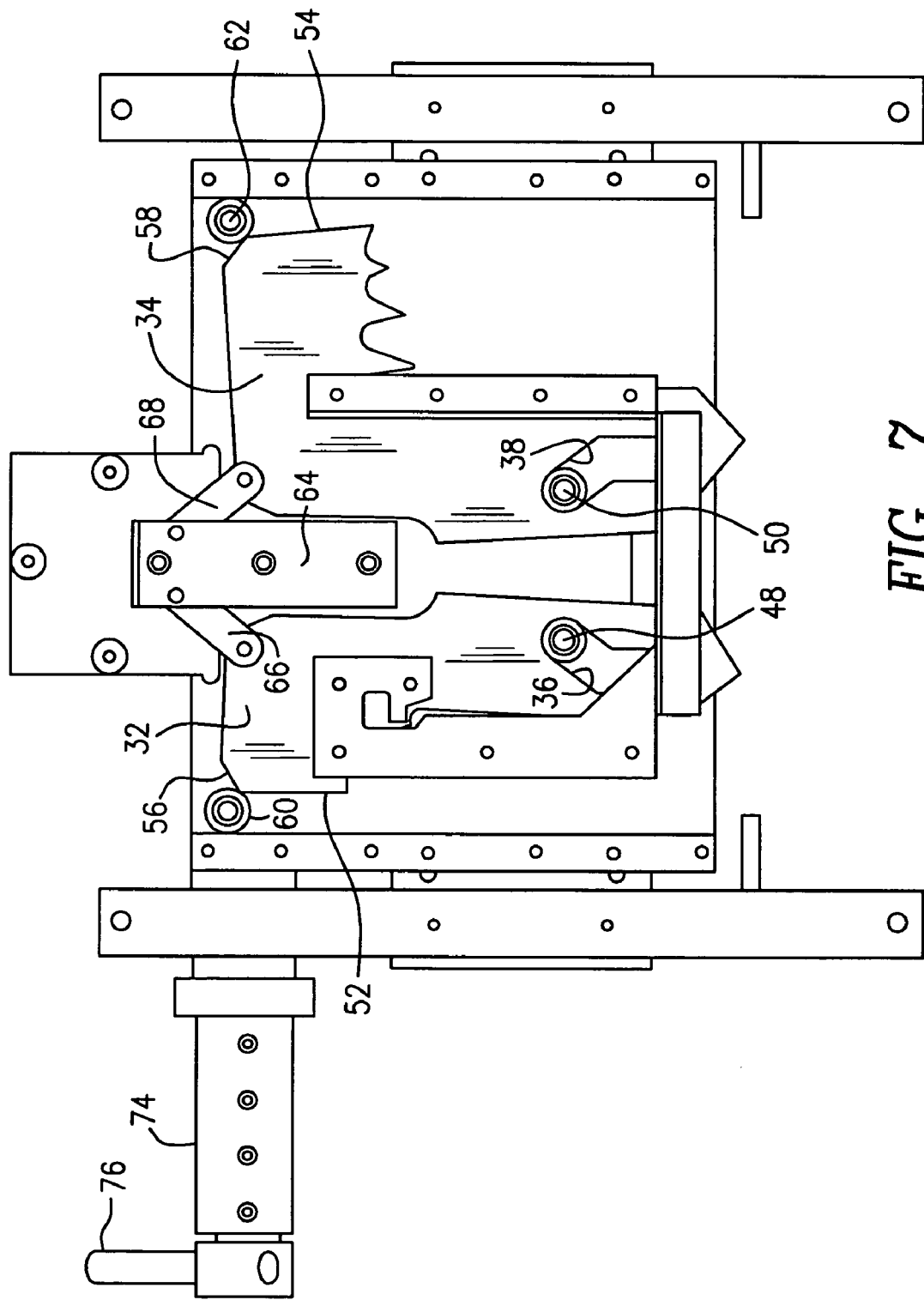

In operation, when it is desired to sever a length of rain gutter, the machine 20 is stopped and the operator takes hold of the lever arm 76. As the lever arm 76 is pulled upwardly, the resulting rotation of the rotary gear 72 causes the block 64 to move downwardly. As the block 64 moves downwardly, the links 66,68 cause the blade members 32,34 to move downwardly. Since the cam followers 48,50 are within the parallel first straight portions 40,42 of the cam openings 36,38 and the guide rollers 60,62 are in contact with the parallel first straight side edge portions 52,54, this downward movement of the blade members 32,34 is constrained to be in a straight downward line, causing the bottoms of the blade members 32,34 to cut through the lower wall 14 of the gutter 10. Continued upward movement of the lever arm 76 results in the cam followers 48,50 moving into the angled second straight portions 44,46 of the cam openings 36,38. Since the guide rollers 60,62 are still in contact with the parallel first straight side edge portions 52,54, the lower ends of the blade members 32,34 are caused to pivot outwardly away from each other about the guide rollers 60,62, as shown in FIG. 7, causing the blade members 32,34 to begin cutting through the back wall 12 and the face wall 16 of the gutter 10.

Figure 8:
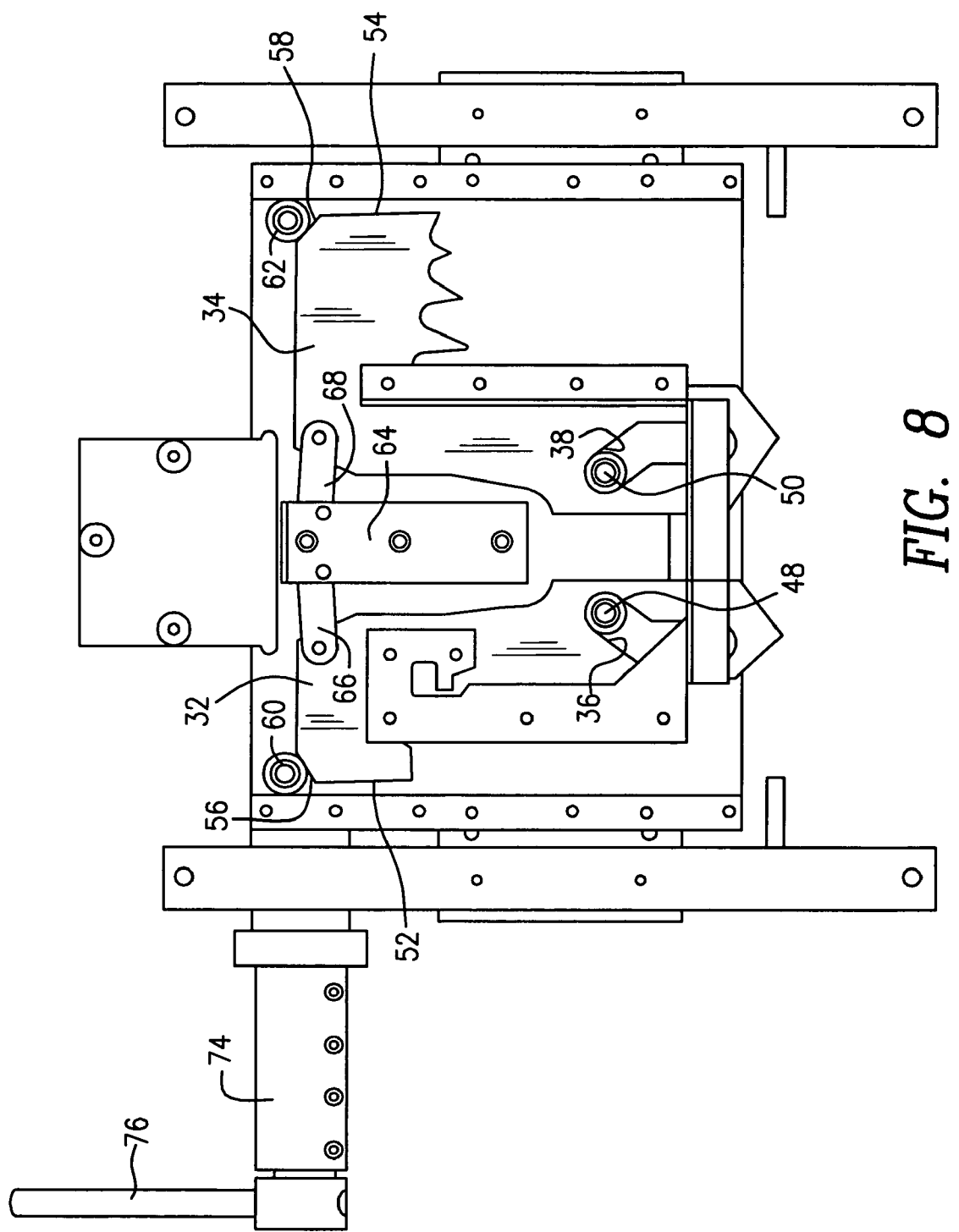

When the cam followers 48,50 reach the upper ends of the respective cam opening second straight portions 44,46, further downward movement of the blade members 32,34 is prevented. The cam openings 36,38 and the first straight side edge portions 52,54 are so dimensioned, and the cam followers 48,50 and the guide rollers 60,62 are so positioned, that when the cam followers reach the upper ends of the respective cam opening second straight portions the guide rollers are at the juncture of the respective first and second straight side edge portions. (See FIG. 7.) Accordingly, further upward movement of the lever arm 76 causes downward movement of the block 64 and outward pivoting of the links 66,68, resulting in the upper ends of the blade members 32,34 pivoting outwardly about the cam followers 48,50 in the opposite angular direction from the previous outward pivoting, as shown in FIG. 8. The links 66,68 give the blade members 32,34 an additional mechanical advantage for this pivoting of the blade members 32,34, during which the blade members 32,34 cut through the upper ends of the back wall 12 and the face wall 16 of the gutter 10. This enhanced mechanical advantage is advantageous because while cutting through the upper end 18 of the face wall 16, the blade member 32 folds the upper end 18 and therefore has to cut through a triple thickness of gutter material before the cut is completed. By providing the enhanced mechanical advantage at this point, the inventive shear assembly allows the operator to cut through the entire gutter with one smooth stroke.

In addition to the disclosed shear assembly construction possessing the benefit of enhanced mechanical advantage, it is also more vertically compact, with a much shorter vertical stroke, as compared to a conventional single blade guillotine shear assembly. This results in a lighter weight shear assembly which is easily handled by a single mechanic when it is required to remove the shear assembly from the roll forming machine for general maintenance or trouble shooting.

Accordingly, there has been disclosed an improved shear assembly for a rain gutter roll forming machine. While an illustrative embodiment of the inventive shear assembly has been disclosed herein, it will be appreciated by those of skill in the art that various modifications and adaptations to the disclosed embodiment are possible. It is therefore intended that this invention be limited only by the scope of the appended claims.

What is claimed is:

1. A shear assembly for a roll forming machine which forms an indeterminate length panel having a desired lateral profile, comprising:
   a blade assembly including a pair of side-by-side coplanar blade members separated along a generally straight line; and
   an actuator mechanism for said blade assembly operative to move said pair of blade members (a) in a first phase of parallel movement along said straight line, (b) followed by a second phase of outward pivoting movement wherein the leading ends of said pair of blade members move away from each other, and (c) followed by a third phase of outward pivoting movement wherein the tail ends of said pair of blade members move away from each other;
   wherein said actuator mechanism includes:
   a block movable along said straight line;
   a pair of link members each pivotally connected at a first end to said block and at a second end to the tail end of a respective one of said blade members;
   a first guide mechanism operative to (a) constrain movement of the leading ends of said blade members during said first phase to movement along said straight line, (b) force the leading ends of said pair of blade members to separate during said second phase, and (c) prevent further movement of the leading ends of said pair of blades along said straight line during said third phase; and
   a second guide mechanism operative to (a) constrain movement of the tail ends of said blade members during said first phase to movement along said straight line, (b) constrain movement of the tail ends of said blade members during said second phase to movement along said straight line, and (c) allow the tail ends of said pair of blade members to separate during said third phase.

2. The shear assembly according to claim 1 wherein said first guide mechanism includes:
   a respective elongated dogleg shaped cam opening in each of said blade members, each of said cam openings having a first straight portion parallel to the first straight portion of the other cam opening and a second straight portion at the upper end of the first straight portion which is angled toward the other of said blade members; and
   a pair of cam followers secured to said machine and each extending into a respective one of said cam openings.

3. The shear assembly according to claim 2 wherein said second guide mechanism includes:
   a respective guide surface on each of said blade members, each guide surface including respective first and second straight side edge portions, wherein each said first straight side edge portion is remote from the other of said blade members and parallel to the first straight side edge portion of the other of said blade members, and each of said first straight side edge portions is terminated at an upper end by a respective said second straight side edge portion which is angled toward the other of said blade members; and
   a pair of guide rollers secured to said machine and each in contact with the guide surface of a respective one of said blade members.

4. A shear assembly for a roll forming machine which forms an indeterminate length panel having a desired lateral profile, the shear assembly comprising:
   a pair of spaced apart die plates secured to said machine and having aligned openings through which said panel is passed;
   a blade assembly including a pair of side-by-side coplanar blade members movable between said pair of die plates, each of said blade members having a respective elongated dogleg shaped cam opening, each of said cam openings having a first straight portion parallel to the first straight portion of the other cam opening and a second straight portion at the upper end of the first straight portion which is angled toward the other of said blade members, each of said blade members having a respective guide surface including respective first and second straight side edge portions, wherein each said first straight side edge portion is remote from the other of said blade members and parallel to the first straight side edge portion of the other of said blade members, and each of said first straight side edge portions is terminated at an upper end by a respective said second straight side edge portion which is angled toward the other of said blade members;
   a pair of cam followers secured to said machine and each extending into a respective one of said cam openings;
   a pair of guide rollers secured to said machine and each in contact with the guide surface of a respective one of said blade members;
   a blade mount assembly including a block and a pair of link members each pivotally connected at a first end to said block and at a second end to a respective one of said blade members above the respective cam opening; and
   an actuator mounted to said machine and operatively coupled to selectively move said block;
   wherein said cam openings and said guide surfaces are so dimensioned and said cam followers and said guide rollers are so positioned that when said cam followers reach the upper end of the respective cam opening second straight portion said guide rollers are at the juncture of the respective first and second straight side edge portions; and
   wherein activation of said actuator causes said block to move, which in turn causes said pair of blade members to move parallel to each other until said pair of cam followers each reaches the second straight portion in the respective cam opening, after which continued movement of said block causes said pair of blade members to pivot away from each other about said pair of guide rollers while said pair of guide rollers each contacts the respective first straight side edge portion, and when continued movement of said block causes said pair of guide rollers to each contact the respective second straight side edge portion said pair of blade members pivot away from each other about said pair of cam followers.

5. The shear assembly according to claim 1 wherein:
   said block has rack gear teeth on one side; and
   said actuator includes a rotary gear engaged with said rack gear teeth.

6. The shear assembly according to claim 5 wherein said actuator further includes:
   a shaft journaled for rotation on said machine; and
   a lever arm secured to said shaft and extending transversely to said shaft;
   wherein said rotary gear is mounted to said shaft for rotation therewith.

* * * * *